United States Patent [19]
Nakayama et al.

[11] Patent Number: 5,500,116
[45] Date of Patent: Mar. 19, 1996

[54] LIQUID-LIQUID CONTACTOR

[75] Inventors: Takashi Nakayama, Handa; Hiroshi Sagara, Yokohama, both of Japan

[73] Assignee: JGC Corporation, Tokyo, Japan

[21] Appl. No.: 275,534

[22] Filed: Jul. 15, 1994

[30] Foreign Application Priority Data

Jul. 19, 1993 [JP] Japan .................................. 5-178081

[51] Int. Cl.$^6$ .................................................. B01D 12/00
[52] U.S. Cl. .................... 210/511; 210/521; 210/DIG. 5; 422/256; 261/113
[58] Field of Search ................................. 210/513, 521, 210/522, 511, 532.1, 538, DIG. 5; 422/255, 256, 257; 261/112.2, 113, 114.1; 196/14.52; 202/158

[56] References Cited

U.S. PATENT DOCUMENTS

| | | | |
|---|---|---|---|
| 4,234,544 | 11/1980 | Christman | 210/532.1 |
| 4,305,907 | 12/1981 | Baird | 210/521 |
| 4,426,361 | 1/1984 | Bushnell | 422/256 |
| 4,511,537 | 4/1985 | Fiocco et al. | 422/256 |
| 4,588,563 | 5/1986 | Fiocco | 210/532.1 |
| 5,393,429 | 2/1995 | Nakayama et al. | 210/522 |

*Primary Examiner*—Robert A. Dawson
*Assistant Examiner*—W. L. Walker
*Attorney, Agent, or Firm*—Varndell Legal Group

[57] ABSTRACT

In a non-agitated, countercurrent flow type liquid-liquid contacting tower, trays consisting of column plates and dams are installed horizontally inside the tower shell alternately in vertical direction with a suitable interval. The column plate share a part of the cross-section of the tower to provide a flow channel or channels for the liquids, and the dam extends from the end of the column plate vertically downward and has openings near the column plate. The liquid-liquid contactor has high contacting efficiency, and thus relatively small sized apparatus can have a large treatment capacity. Because the apparatus has no moving element, maintenance is easy.

7 Claims, 5 Drawing Sheets

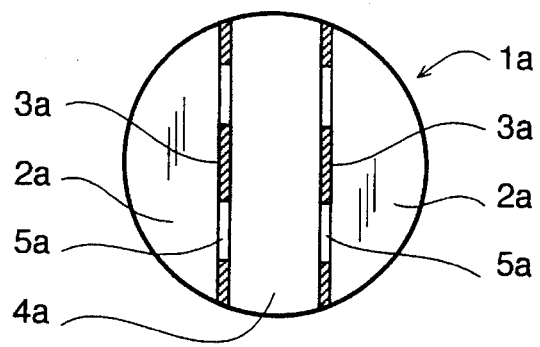
FIG.9
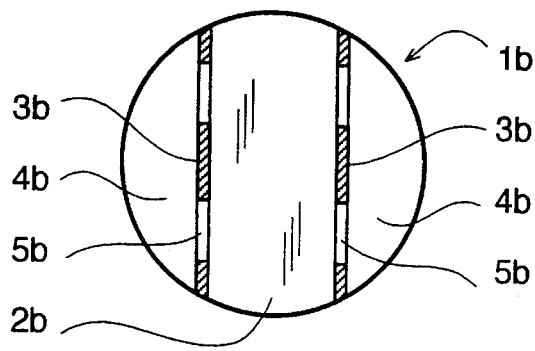
FIG.10
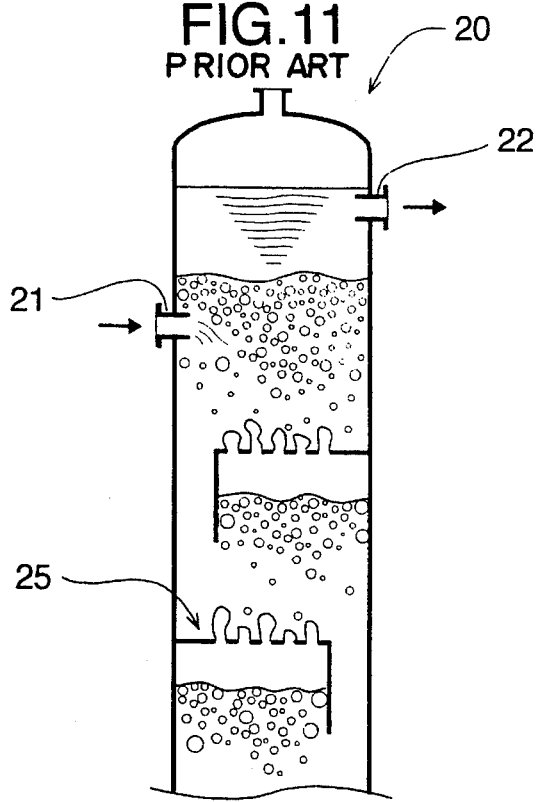
FIG.11
PRIOR ART
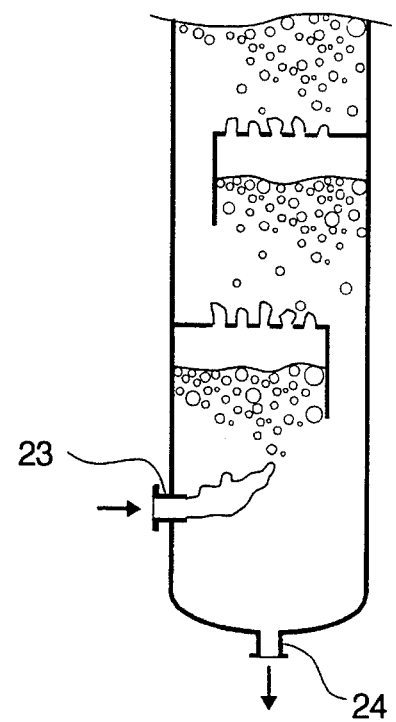

LIQUID-LIQUID CONTACTOR

BACKGROUND OF THE INVENTION

1. Field in the Industry

The present invention concerns a liquid-liquid contactor, particularly, improvements in liquid-liquid contactor in which mutually insoluble two liquids are continuously contacted in countercurrent flow due to the density difference between the two liquids. Typical use of the liquid-liquid contactor is liquid-liquid extraction and liquid-liquid reaction, which are important unit operations in the petroleum refinery, petrochemistry, coal chemistry, nuclear energy processing, and many other process industries.

2. State of the Art

Countercurrent flow type liquid-liquid contactors are divided into two types: one is non-agitated type such as perforated plate towers, packed towers, and baffle towers; and the other is mechanically agitated or pulsed type, such as rotary disk towers, Oldshue-Rushton towers, pulsed towers and reciprocal extraction towers.

Contactors of the latter type exhibit high contacting efficiency per unit height of the apparatus. The contactors of this type, however, have drawbacks that equipment investment is high and maintenance is troublesome, because they have mechanically driven parts. On the other hand, contactors of the non-agitated type are advantageous, though the contacting efficiency thereof is relatively low, because of lower investment and easy maintenance.

The inventors have continued research for improvements in the former type, non-agitated liquid-liquid contactors which can be installed with lower investment and operated with easy maintenance, particularly, in perforated plate towers having relatively high contacting efficiency.

Conventional perforated plate towers have the structure, as shown in FIGS. 11 and 12 (the Figures illustrate an embodiment in which light liquid "L" is the dispersed phase and heavy liquid "H" is the continuous phase), that a heavy liquid inlet (21) and a light liquid outlet (22) are provided at the top of a tower (20), that a light liquid inlet (23) and heavy liquid outlet (24) are provided at the bottom of the tower, and that plural trays (25) are distributed in the tower.

The tray (25) consists of a horizontal perforated plate (26) which is prepared by cutting off a part of a round perforated plate to provide a flow channel for liquid stream, and a vertical plate (27) which extends vertically downward (dispersed phase feeding direction) from the free end of the horizontal perforated plate. The flow channel formed by cutting off of the perforated plate and the vertical plate is the spout for overflow (the illustrated spout is called a "downcomer") or a channel for continuous phase liquid (29), through which only the continuous phase (heavy liquid) flows, and the apertures are channels for dispersed phase liquid (28) through which only the dispersed phase (light liquid) flows.

Operation of this perforated plate tower is carried out by feeding the light liquid from the light liquid inlet (23) at the bottom of the tower (20), and, at the same time, by feeding the heavy liquid from the heavy liquid inlet (21) at the top of the tower.

The two liquids are fed in such a manner that one of them forms a continuous phase, and the other, a dispersed phase. In the illustrated embodiment where the light liquid forms the dispersed phase, the light liquid is fed under the conditions that the flow rate of the light liquid to that of the heavy liquid forming the continuous phase is such a value that droplets of the dispersed phase accumulate and coalesce to a coalesced layer of the dispersed phase during staying under the perforated plates and moving upwardly, and that the coalesced layer of the dispersed phase flows out through the apertures or the channels for the dispersed phase liquid (28).

After having a component in the heavy liquid extracted with the light liquid, or contrarily, having a component in the light liquid extracted with the heavy liquid, or causing chemical reactions between the light and the heavy liquids by continuous and countercurrent liquid-liquid contacting of the light and the heavy liquids in the tower (20) as described above, the spent light liquid is drawn out through the light liquid outlet (22) and the spent heavy liquid through the heavy liquid outlet (24) continuously.

The above described perforated plate towers exhibit higher liquid-liquid contacting efficiencies per unit stage when compared with those of baffle towers having larger open areas of the channels for liquid streams. However, operation satisfying the above mentioned flow rate condition for the dispersed phase requires that the area of the channel for the dispersed phase liquid (28) is small or the apertures of the perforated plate are small, and therefore, feeding rate of the dispersed phase cannot be increased so much and the throughput of the liquids may not be enhanced.

In order to eliminate the above mentioned drawbacks the inventors performed the following experiments.

At first, they used a conventional perforated plate tower and increased the flow rates of the liquids at a constant ratio of the flow rates of the dispersed phase to the continuous phase until flooding occurs, and determined the liquid-liquid contacting efficiencies. The observed efficiencies were low in comparison with those under normal operations, and thus, it was concluded impossible to increase flow rate of the liquid to be treated while keeping the contacting efficiency high.

Then, they increased flow rate of the dispersed phase liquid by increasing open area of the channels for dispersed phase liquid by enlarging diameters of the apertures or by increasing the number of the apertures. This resulted in decreased thickness of the coalesced layer of the dispersed phase under the perforated plate (26), and in some occasion small changes in the operating conditions cause even disappearance of the coalesced layer of the dispersed phase. Thus, neither stable operation nor constant liquid-liquid contacting efficiency was possible. Further, it was observed that, in case where the coalesced layer of the dispersed phase disappears, the contacting efficiency becomes significantly low. The experiments suggested that developing this type of contacting is not hopeful.

SUMMARY OF THE INVENTION

The object of the present invention is to provide a liquid-liquid contactor enabling both a higher throughput and a higher contacting efficiency, which cannot be expected by the conventional non-agitated liquid-liquid contactors. More specifically, the object of the invention is to provide a liquid-liquid contactor in which, even if the quantities of the treated liquids are much increased by enlarging the areas of the channels for the dispersed phase, coalescence of the dispersed phase droplets to form coalesced layer of the dispersed phase and breaking up of the coalesced layer to form droplets, are surely repeated, and a high contacting efficiency is maintained.

The apparatus of the present invention is a liquid-liquid contactor wherein a heavy liquid is fed from the top of a contactor and a light liquid is fed from the bottom of the contactor so as to continuously contact both the liquids, one of the two liquids forming a dispersed phase and the other forming a continuous phase in countercurrent flow in the contactor; characterized in that the contactor comprises a tower shell and trays consisting of column plates and dams, the column plates extending in horizontal direction in the tower to cover a part of the cross section of the tower so as to form flow channels for the continuous and dispersed phases, the dams extending vertically from the free ends of the column plates in the direction of feeding the dispersed phase and providing openings therein to allow the dispersed phase flow therethrough so that droplets of the dispersed phase from an upstream column plate may stay under a downstream column plate, that the droplets may coalesce to form a coalesced layer of the dispersed phase during staying and that the coalesced layer may flow out in horizontal direction through the openings in the dams.

BRIEF EXPLANATION OF THE DRAWINGS

The present invention will be described in detail with reference to the drawings. In the drawings, numerical references for the parts which are common to those of the conventional apparatus are the same as those for the conventional ones.

FIG. 9 is a cross-sectional view in C—C direction of FIG. 8;

FIG. 10 is a cross-sectional view in D—D direction of FIG. 8;

FIG. 11 is a vertical-sectional view of a conventional perforated plate liquid-liquid contactor to illustrate structure and mechanism thereof.

DETAILED EXPLANATION OF THE PREFERRED EMBODIMENTS

Figure 1:
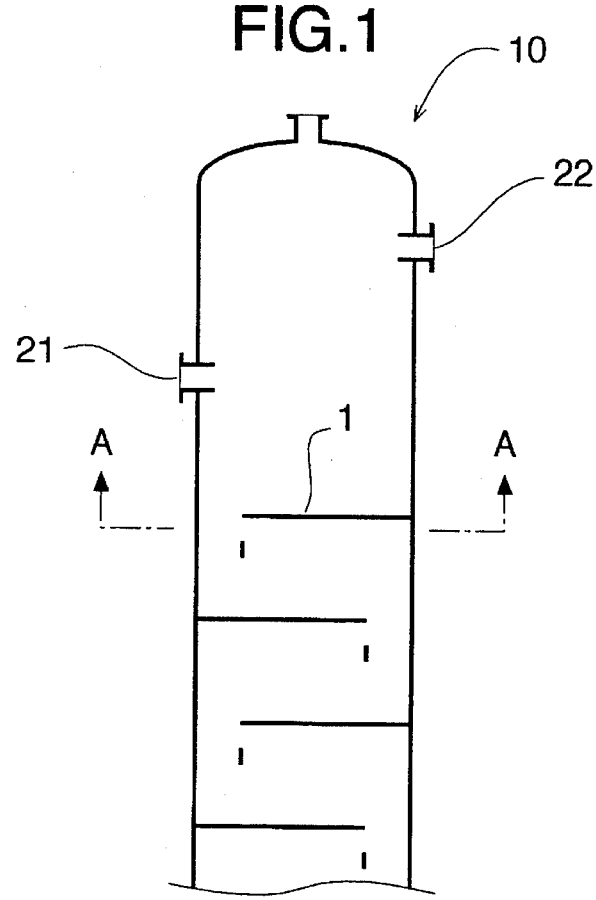
FIG. 1 is a vertical cross-sectional view of an embodiment of the liquid-liquid contactor of the invention to illustrate the whole structure thereof.
Figure 1:
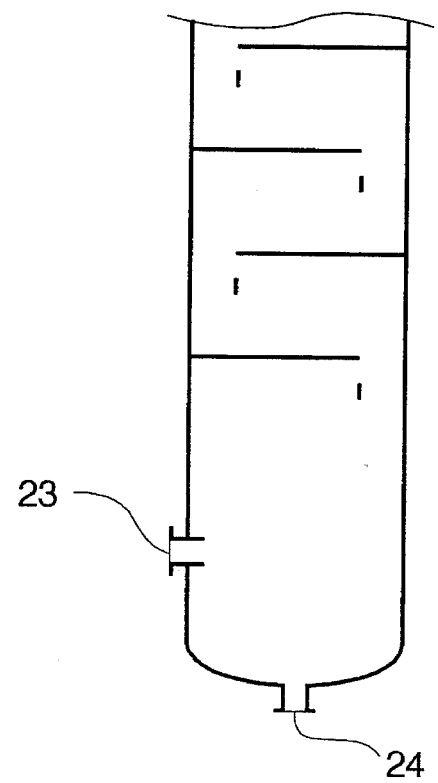

In the liquid-liquid contactor of the present invention, as shown in FIG. 1, a heavy liquid inlet (21) and a light liquid outlet (22) are provided at the top of the tower (10), a light liquid inlet (23) and a heavy liquid outlet (24) are provided at the bottom of the tower (10), and plural trays (1) are distributed in the tower (10).

Figure 2:
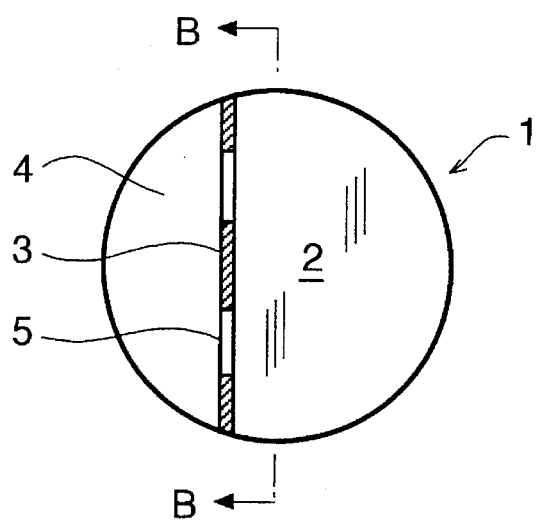
FIG. 2 is a cross-sectional view in A—A direction of FIG. 1.
Figure 3:
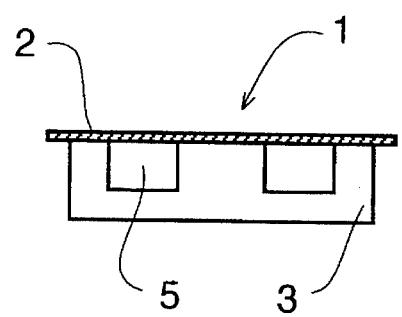
FIG. 3 is a vertical-sectional view in B—B direction of FIG. 1.

The tray (1) used in the present apparatus, as shown in FIG. 2 and FIG. 3, consists of a horizontal column plate (2) formed by cutting off a part of a round plate to provide a channel (4) for the continuous and dispersed phases and a dam (3) vertically extending downward (in the direction of dispersed phase feeding) from the end of the column plate at the liquid channel (4). In the dam there are provided openings (5) which are channels for the dispersed phase liquid.

Figure 4:
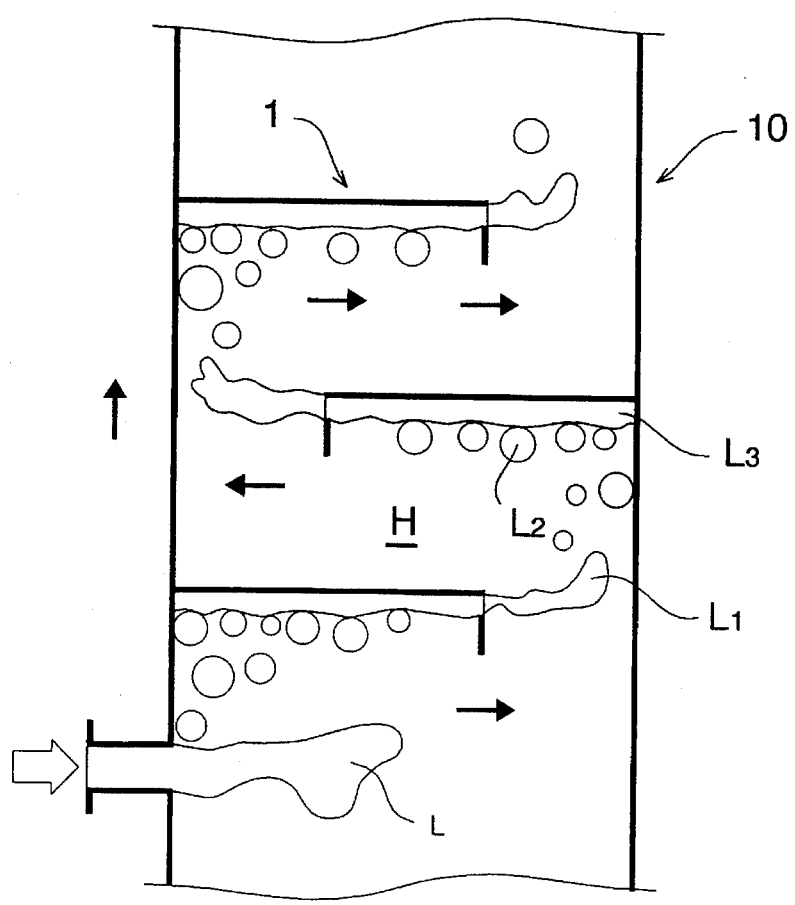
FIG. 4 is an enlarged vertical-sectional view of the major part of the invented contactor at the time of operation to illustrate the mechanism of the apparatus.

Under the column plate (2) or on the side of the dispersed phase feeding, as shown in FIG. 4, droplets of the dispersed phase accumulate and coalesce while they stay there to form a coalesced layer of the dispersed phase. The coalesced layer of the dispersed phase thus formed flows out in the horizontal direction through the opening (5) of the dam (3).

Operation of the liquid-liquid contactor of the present invention is carried out, as in the conventional perforated plate towers, by feeding a fresh light liquid from the light liquid inlet (23) at the bottom of the tower (10) and a fresh heavy liquid from the heavy liquid inlet (21) at the top so that one of them may become the dispersed phase and the other, the continuous phase, and at the same time, by withdrawing the spent light liquid which contacted the heavy liquid from the light liquid outlet (22) at the top of the tower (10) and the spent heavy liquid which contacted the light liquid from the heavy liquid outlet (24) at the bottom of the tower (10).

In the liquid-liquid contactor where the trays (1) of the above described structure are distributed in the tower (10) in the positions of alternate 180° rotation, the continuous phase liquid and the dispersed phase liquid flow in zigzag lines from one side to the other side of the tower wall, and thus liquid-liquid contacting efficiency is enhanced.

The dam (3) must have such a height that prevents overflow of the dispersed phase droplets, however, the height may be smaller than that of downcomers used in the conventional perforated plate tower. This is because the droplets in the conventional perforated plate tower form a coalesced layer during their movements in the vertical direction (see FIG. 12), the vertical plate (27) must have the length corresponding to the distance necessary for the coalescence, while in the contactor of the present invention, as shown in FIG. 4 with arrows, the dispersed phase droplets accumulate and coalesce during their movements in the horizontal direction under the column plate (2), and thus, the distance between trays in the height can be much shorter.

Figure 5:
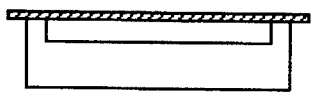
FIG. 5 is a vertical-sectional view like FIG. 1 showing other embodiments of the dam and the opening in the invented apparatus.
Figure 6:
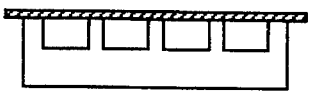
FIG. 6 is a vertical-sectional view like FIG. 5.
Figure 7:
FIG. 7 is a vertical-sectional view like FIG. 5.

Suitable areal percentage of the openings (5) formed in the dam as the channels for the dispersed phase liquid is in the range of 2–30%, preferably, 3–15%, of the cross sectional area of the tower. Any shape of the openings may be adopted as far as it is pertinent to the object of the invention. In addition to the shape shown in FIG. 3, those shown in FIGS. 5 to 7 may be used. The areal percentages of the openings of these embodiments may be chosen on the basis of the flow rates of the liquids to be treated, with large degree of freedom in designing.

Figure 8:
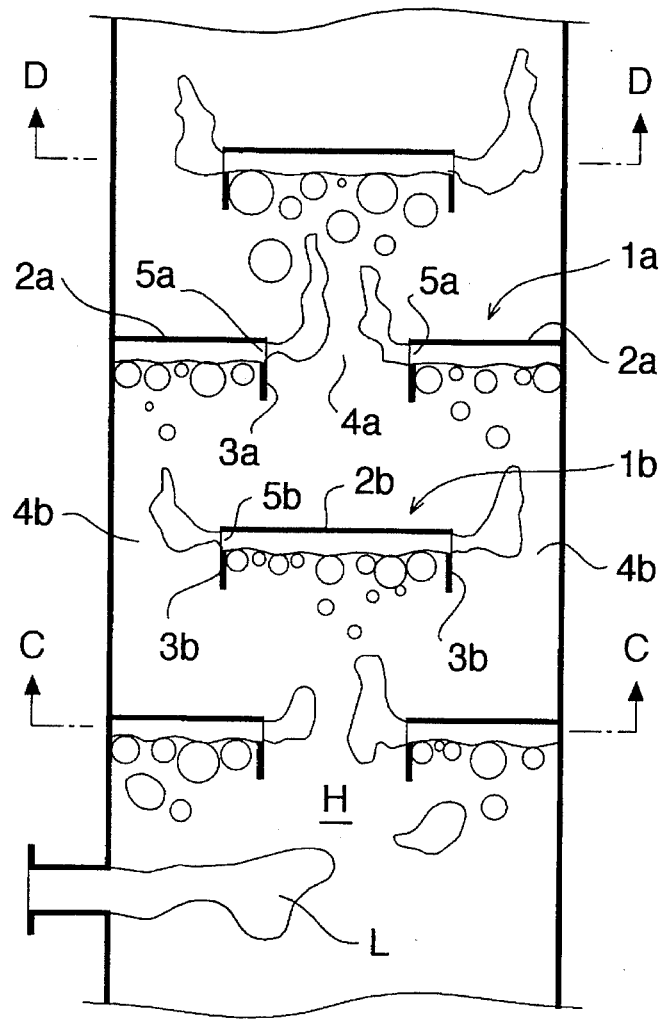
FIG. 8 is an enlarged vertical-sectional view like FIG. 4 to illustrate mechanism of another embodiment of the invented apparatus.

Another embodiment of the present invention is shown in FIGS. 8 to 10. In this embodiment, two stages of trays form one set which provides a liquid-liquid contactor of two-pass type (two channels for the liquids) enabling higher throughput. (In the Figures the same numerical references are assigned to the parts common to those in the embodiment described above.)

The first tray (1a), as shown in FIG. 9, consists of a pair of column plates (2a) providing the first channel for the liquids (4a) therebetween and dams (3a) vertically extending downward from the ends of the column plates (2a) at the channel. The first tray functions as the tray (1) described in relation to the above embodiment.

The second tray (1b) consists of a column plate (2b) of the shape shown in FIG. 10, which extends horizontally to cover the first channel provided by the first column plates (1a) and provides two second channels (4b, 4b), and dams (3b, 3b) vertically extending from the both ends of the column plate at the second channels. The second tray functions as the tray (1) described in relation to the above embodiment.

By distributing the first trays (1a) and the second trays (1b) alternately in the tower (10) as shown in FIG. 8 the contactor of the second embodiment may treat a larger quantities of the liquids than the contactor of the first embodiment.

In the second embodiment described above, it can be provided a contactor of multipass type (three or more channels for the liquids). In the contactor of multipass type, column plates of the first tray are formed providing two or more first channels for the liquids, and column plates of the second tray are formed providing three or more second channels for the liquids, and the first and the second channels do not exist at the same position along vertical axis.

In the liquid-liquid contactor of the present invention, coalesced layers of dispersed phase ($L_3$) flow out through the dispersed phase channels (5, 5a, 5b), which are provided to correspond to the quantities of the liquids to be treated, as jet streams ($L_1$) in the horizontal direction and the coalesced layers are surely divided by shearing stresses given by the continuous phase (H) to transform to the droplets ($L_2$). The droplets move upward under contacting the continuous phase, accumulate and coalesce during staying under the column plate of the next stage to form a coalesced layer of dispersed phase. By surely repeating the dispersion and coalescence of the droplets, extraction of a certain component in the heavy liquid with the light liquid, or contrarily, extraction of a certain component in the light liquid with the heavy liquid, or chemical reactions between the two liquids can be carried out with a high contacting efficiency.

In both the Controls and Examples below, liquid-liquid extraction was carried out to extract methacrylic acid water solution (hereinafter referred to as "feedstock") of concentration 12% (w. %, the same in the following description) with iso-octane (hereinafter referred to as "solvent").

Control 1

Figure 12:
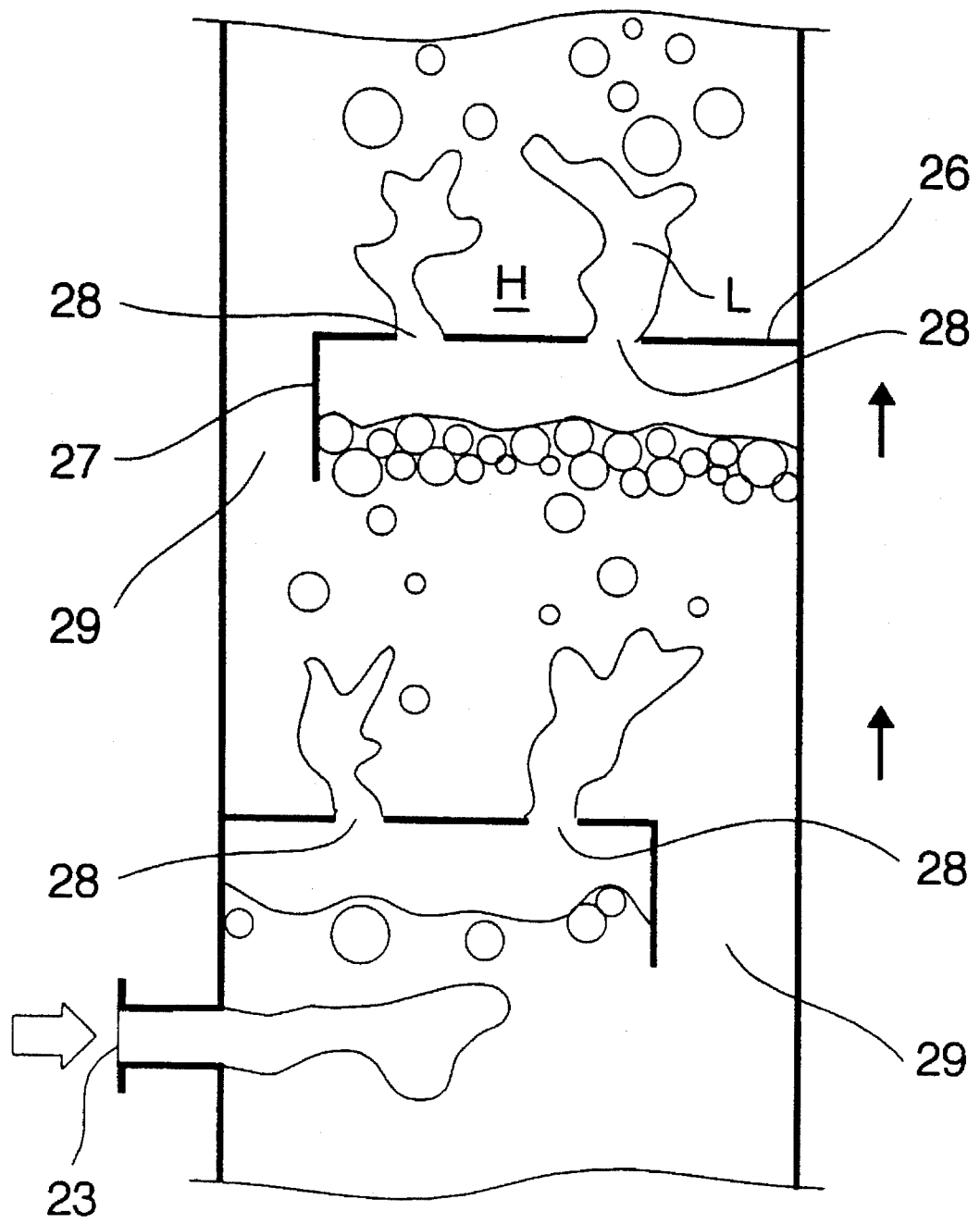
FIG. 12 is an enlarged vertical-sectional view of major part of FIG. 11 and corresponding to FIGS. 4 and 8.

As the apparatus for extraction, a perforated plate tower of the structure shown in FIGS. 11 and 12 was used. In the tower of inner diameter of 75 mm, 10 perforated plates having each five holes of 4 mm diameter (areal percentage of downcomer parts to the cross section of the tower is 14%) were distributed with a uniform intervals of 150 mm.

The feedstock is a heavy liquid and the solvent is a light liquid. The latter was fed as the dispersed phase, and was contacted with the former at the solvent ratio (solvent/feedstock) of 1.38/1.0, at 20° C. under atmospheric pressure.

At the flow rates of 56 kg/Hr for the feedstock and of 78 kg/Hr for the solvent (methacrylic acid concentration 0%), the flow rate of the raffinate was 53 kg/Hr, with methacrylic acid concentration of 7.3%. Liquid-liquid equilibrium calculation was done and gave a height per theoretical stage (hereinafter referred to as "HETS"; a lower value indicates better performance) of 2.9 m.

When the flow rates of the feedstock and solvent were increased to 84 kg/Hr and 116 kg/Hr, respectively, flooding occurred.

Example 1

As the apparatus for extraction, a contactor according to the present invention of the structure shown in FIGS. 1 to 4 was used. In the contactor of an inner diameter 75 mm, 19 stages of trays, each of which consists of a column plate providing a liquid flow channel of areal percentage 32% for the dispersed phase flow channel and a dam having two square openings of 10 mm×10 mm with uniform intervals 75 mm. The operating conditions other than the rate of feedstock, such as solvent ratio, were the same as those of Control 1.

At the flow rate of 84 kg/Hr for the feedstock and that of 116 kg/Hr for the solvent (methacrylic acid concentration 0%), the flow rate of the raffinate was 80 kg/Hr, with methacrylic acid concentration of 7.0%. HETS given by the liquid-liquid equilibrium calculation was 2.7 m.

When the flow rates of the feedstock and solvent were increased to 113 kg/Hr and 156 kg/Hr, respectively, the flow rate of the raffinate was 107 kg/Hr, with methacrylic acid concentration of 7.4%, and HETS was 3.0 m.

Table 1 summarizes the amount of the treatment and extraction efficiencies in Control 1 and Example 1.

TABLE 1

| Flow Rate (kg/Hr) | | Extraction Efficiency | | | |
| --- | --- | --- | --- | --- | --- |
| | | Control 1 | | Example 1 | |
| Feedstock | Solvent | Extraction (%) | HETS (m) | Extraction (%) | HETS (m) |
| 56 | 78 | 42 | 2.9 | — | — |
| 84 | 116 | * | * | 45 | 2.7 |
| 113 | 156 | — | — | 42 | 3.0 |

*flooding occurred

The results in Table 1 show that, in the contactor according to the present invention, even if the rates of supplying are increased to such a level as much higher than that of the conventional perforated plate tower to increase throughput, total liquid-liquid contacting efficiency does not decrease.

Control 2

As an extraction apparatus, a conventional apparatus of the structure shown in FIGS. 11 and 12 was used. The apparatus is a perforated plate tower of inner diameter of 75 mm, in which 10 perforated plates having each 72 holes of 4 mm diameter (areal percentage of downcomer parts to the cross section of the tower is 14%) were distributed with uniform intervals of 200 mm.

The feedstock is a heavy liquid and the solvent is a light liquid. The latter was fed as the dispersed phase, and was contacted with the former at the solvent ratio (solvent/feedstock) of 1.38/1.0, at 20° C. under atmospheric pressure.

At the flow rates of 900 kg/Hr for the feedstock and that of 1240 kg/Hr for the solvent (methacrylic acid concentration 0%), the flow rate of the raffinate was 855 kg/Hr, with methacrylic acid concentration 7.4%. Liquid-liquid equilibrium calculation gave a HETS of 4.0 m.

When the flow rates were increased to 1350 kg/Hr for feedstock and 1860 kg/Hr for solvent, flooding occurred.

Example 2

As the apparatus for extraction, a contactor according to the present invention of the structure shown in FIGS. 1 to 4 was used. In the tower of inner diameter 300 mm, 19 stages of trays, each of which consists of a column plate providing a liquid flow channel of areal percentage 32% as the dispersed phase flow channels and a dam having four rectangular openings of height 40 mm×width 20 mm with a uniform intervals of 100 mm. The operating conditions other than the feedstock rate, such as solvent ratio, were the same as those of Control 2.

At the flow rates of 1350 kg/Hr for the feedstock and that of 1860 kg/Hr for the solvent (methacrylic acid concentration 0%), the flow rate of the raffinate was 1250 kg/Hr, with methacrylic acid concentration of 4.7%. HETS by the liquid-liquid equilibrium calculation was 2.5 m.

When the flow rates were increased to 1800 kg/Hr for the feedstock and 156 kg/Hr for the solvent, the flow rate of the raffinate was 1670 kg/Hr, with methacrylic acid concentration of 5.2%, and HETS was 2.7 m.

Table 2 compares the throughput and the extraction efficiencies between Control 2 and Example 2.

TABLE 2

| Flow Rate (kg/Hr) | | Extraction Efficiency | | | |
| --- | --- | --- | --- | --- | --- |
| | | Control 1 | | Example 1 | |
| Feedstock | Solvent | Extraction (%) | HETS (m) | Extraction (%) | HETS (m) |
| 900 | 1240 | 42 | 4.0 | — | — |
| 1350 | 1860 | * | * | 64 | 2.5 |
| 1800 | 2490 | — | — | 60 | 2.7 |

*flooding occurred

From the data shown in Table 2, it is understood that a larger tower diameter gives better results than those of the smaller tower diameter in Table 1. In other words, the contacting efficiency per stage improves in larger diameter towers. This is considered to be due to longer distance of horizontal movement of the droplets under the trays, i.e., the movements ensure formation of coalesced layers, which result in the increased efficiencies.

In the liquid-liquid contactor of the present invention, areal percentages of the opening as the flow channel for the dispersed phase can be larger than those of the apertures of the conventional perforated plate towers. Thus, diameters of the droplets of the dispersed phase can be large, and the treatment capacity may be increased. Repetition of dispersion and coalescence of the dispersed phase within shorter distance in regard to the vertical direction ensures liquid-liquid contacting efficiency of at least the same extent as the conventional perforated plate towers.

Further, in the present invention, because the droplets of the dispersed phase flow out in nearly horizontal direction to contact the continuous phase which flows downward, and the liquid jet of the dispersed phase is broken up by strong shearing stress of the stream of the continuous phase into small droplets, and thus, the resultant uniform dispersion improves the liquid-liquid contacting efficiency.

Moreover, because the coalesced layer of dispersed phase flows out horizontally and accumulation and coalescence of the droplets occur during horizontal movement, it is possible to hold down the total tower height low. In a tower of the same height many more trays can be installed therein so that the total liquid-liquid contacting efficiency may be improved.

We claim:

1. A liquid-liquid contactor with a top and a bottom for receiving a heavy liquid feed from the top and a light liquid feed from the bottom so as to continuously contact both liquids, one of the two liquids forming a dispersed phase and the other forming a continuous phase in countercurrent flow in the contactor; the contactor comprising trays arranged between the top and bottom and a tower shell surrounding the trays, the trays including column plates and dams, the column plates extending in a horizontal direction in the tower to cover a part of a cross section of the tower so as to form flow channels for the continuous and dispersed phases, the dams extending vertically from free ends of the column plates in a direction of feeding the dispersed phase and having internal openings therein permitting the dispersed phase to flow therethrough so that droplets of the dispersed phase from an upstream column plate stay under a downstream column plate, the droplets coalesce to form a coalesced layer of the dispersed phase while under the downstream column plate and the coalesced layer flows out in a horizontal direction through the openings in the dams.

2. A liquid-liquid contactor of claim 1, wherein the trays have a same shape and are distributed in the tower in positions of alternate 180° rotation, and the continuous phase liquid and the dispersed phase liquid flowing through the openings make zigzag lines from one side to another side of the tower wall alternatively.

3. A liquid-liquid contactor of claim 1, wherein the openings are adjacent the column plates.

4. A liquid-liquid contactor of claim 1, wherein the openings extend only partly across a cross-sectional area of the dams, and the openings are adjacent the column plates.

5. A liquid-liquid contactor of claim 1, where the trays and column plates are arranged so that the dispersed phase flows freely from the openings in the dams of the downstream column plate to the upstream column plate.

6. A liquid-liquid contactor with a top and a bottom for receiving a heavy liquid feed from the top and a light liquid feed from the bottom so as to continuously contact both liquids, one of the two liquids forming a dispersed phase and the other forming a continuous phase in countercurrent flow in the contactor; the contactor comprising trays arranged between the top and bottom and a tower shell surrounding the trays, the trays including a column plates and dams, the column plates extending in a horizontal direction in the tower and covering a part of a cross section of the tower so as to form flow channels for the continuous and dispersed phases, the dams extending vertically from free ends of the column plates in a direction of feeding the dispersed phase and having openings therein permitting the dispersed phase to flow therethrough so that droplets of the dispersed phase from an upstream column plate stay under a downstream column plate, the droplets coalesce to form a coalesced layer of the dispersed phase while under the downstream column plate, and the coalesced layer flows out in a horizontal direction through the openings in the dams, wherein the trays include first trays providing liquid flow channels at both sides thereof and second trays providing a liquid channel at one side thereof, and the first and the second trays are distributed alternately in the tower in such relative positions that the liquid flow channels do not exist at the same position along a vertical axis so that the continuous phase and dispersed phase liquids repeat divisional flow and joint flow.

7. A liquid-liquid contactor with a top and a bottom for receiving a heavy liquid feed from the top and a light liquid feed from the bottom so as to continuously contact both liquids, one of the two liquids forming a dispersed phase and the other forming a continuous phase in countercurrent flow in the contactor; the contactor comprising trays arranged between the top and bottom and a tower shell surrounding the trays, the trays including column plates and dams, the column plates extending in a horizontal direction in the tower and covering a part of a cross section of the tower so as to form flow channels for the continuous and dispersed phases the dams extending vertically from free ends of the column plates in a direction of feeding the dispersed phase and having openings therein permitting the dispersed phase to flow therethrough so that droplets of the dispersed phase from an upstream column plate stay under a downstream column plate, the droplets coalesce to form a coalesced layer of the dispersed phase while under the downstream column plate, and the coalesced layer flows out in a horizontal direction through the openings in the dams, wherein the trays include first trays providing two or more liquid flow channels and second trays providing at least one liquid channel, and wherein the first and the second trays are distributed alternately in the tower in such relative positions that the liquid flow channels do not exist at the same position along the vertical axis so that the continuous phase and dispersed phase liquids repeat divisional flow and joint flow.

* * * * *